(12) United States Patent
Wylie et al.

(10) Patent No.: US 10,673,958 B1
(45) Date of Patent: Jun. 2, 2020

(54) SYSTEM AND METHOD FOR MAINTAINING USER SESSION CONTINUITY ACROSS MULTIPLE DEVICES AND/OR MULTIPLE PLATFORMS

(71) Applicant: Capital One Services, LLC, McLean, VA (US)

(72) Inventors: Stephen Wylie, Carrollton, TX (US); Qiaochu Tang, The Colony, TX (US); Micah Price, Anna, TX (US); Jason Hoover, Grapevine, TX (US); Geoffrey Dagley, McKinney, TX (US); Habeeb Hooshmand, Katy, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/549,252

(22) Filed: Aug. 23, 2019

(51) Int. Cl.
*H04L 29/08* (2006.01)
*H04L 29/06* (2006.01)

(52) U.S. Cl.
CPC ............ *H04L 67/148* (2013.01); *H04L 63/08* (2013.01); *H04L 63/12* (2013.01); *H04L 67/145* (2013.01); *H04L 67/146* (2013.01); *H04L 67/303* (2013.01); *H04L 67/42* (2013.01)

(58) Field of Classification Search
CPC ..... H04L 67/148; H04L 63/12; H04L 67/146; H04L 67/145; H04L 67/42; H04L 67/303; H04L 63/08
See application file for complete search history.

(56) References Cited

U.S. PATENT DOCUMENTS

| | | | | |
|---|---|---|---|---|
| 8,813,125 | B2* | 8/2014 | Reisman | H04L 67/10 725/34 |
| 8,954,554 | B2* | 2/2015 | Bagwandeen | G16H 40/63 709/223 |
| 9,003,299 | B2* | 4/2015 | Freedman | G06F 9/449 715/745 |
| 9,571,536 | B2* | 2/2017 | Jain | H04L 67/141 |
| 10,366,431 | B1* | 7/2019 | Shah | H04L 67/141 |
| 10,375,105 | B2* | 8/2019 | Kozloski | H04L 67/22 |
| 10,505,997 | B2* | 12/2019 | Linden | H04L 67/146 |
| 2006/0075110 | A1* | 4/2006 | Seraphin | H04L 67/142 709/227 |
| 2011/0258550 | A1* | 10/2011 | Dinh-Trong | H04L 67/14 715/736 |
| 2014/0115032 | A1* | 4/2014 | Chanderraju | H04W 4/21 709/203 |

(Continued)

*Primary Examiner* — Ramy M Osman
(74) *Attorney, Agent, or Firm* — Harrity & Harrity, LLP

(57) ABSTRACT

A session continuity platform may detect a user action during a first user session associated with a first user device, wherein the first user session is associated with a first platform. The session continuity platform may determine identification information of a user associated with the user session. The session continuity platform may determine a continuity record identifier associated with the identification information. The session continuity platform may obtain, based on the continuity record identifier, activity data from a plurality of continuity records of a distributed ledger. The session continuity platform may determine, based on the activity data, activity information associated with the user action and the second user session. The session continuity platform may cause the first user device to present the activity information via a display of the user device.

20 Claims, 10 Drawing Sheets

(56) References Cited

U.S. PATENT DOCUMENTS

| | | | |
|---|---|---|---|
| 2014/0280930 A1* | 9/2014 | Foo | H04L 63/0861 |
| | | | 709/225 |
| 2016/0323389 A1* | 11/2016 | Miller | H04L 67/148 |
| 2017/0046651 A1 | 2/2017 | Lin et al. | |
| 2017/0310763 A1* | 10/2017 | Morgan | H04L 67/141 |
| 2018/0225693 A1* | 8/2018 | Postrel | H04L 67/306 |
| 2018/0255090 A1 | 9/2018 | Kozloski et al. | |
| 2019/0026829 A1* | 1/2019 | Nakata | H04L 9/3239 |
| 2019/0109706 A1* | 4/2019 | Peterson | H04L 9/3239 |
| 2019/0213518 A1* | 7/2019 | Lee | G06Q 20/322 |
| 2019/0281095 A1* | 9/2019 | Ein-Gil | H04L 67/14 |
| 2019/0289031 A1* | 9/2019 | Kozloski | H04L 63/145 |

\* cited by examiner

SYSTEM AND METHOD FOR MAINTAINING USER SESSION CONTINUITY ACROSS MULTIPLE DEVICES AND/OR MULTIPLE PLATFORMS

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some implementations, a method may include monitoring, during a user session, a user interface associated with a first user device, wherein the user interface includes a plurality of user interface objects and wherein the user interface is associated with a first platform; detecting a first user action of the user session, wherein the first user action is associated with a first user interface object of the plurality of user interface objects; determining identification information of a user associated with the first user action; determining a continuity record identifier associated with the identification information; obtaining a continuity record associated with the continuity record identifier, wherein the continuity record is stored in a distributed ledger, wherein the distributed ledger includes a plurality of continuity records associated with a plurality of user actions during previous user sessions associated with the user, and wherein one or more of the plurality of continuity records are accessible to a plurality of nodes; obtaining, from the continuity record, activity data associated with a second user action, wherein the second user action is one of the plurality of user actions and wherein the second user action involves the user interface object; determining, based on the activity data, activity information associated with the first user action and the second user action; and causing the first user device to present the activity information, wherein the activity information is presented via a display of the first user device.

According to some implementations, a device may include one or more memories; and one or more processors, communicatively coupled to the one or more memories, configured to: detect a user action during a first user session associated with a first user device, wherein the first user session is associated with a first platform; determine identification information of a user associated with the user session; determine a continuity record identifier associated with the identification information; obtain, based on the continuity record identifier, activity data from a plurality of continuity records of a distributed ledger, wherein the activity data is associated with a second user session, wherein the plurality of continuity records are associated with a plurality of user sessions associated with the user, and wherein one or more of the plurality of continuity records are accessible to a plurality of nodes; determine, based on the activity data, activity information associated with the user action and the second user session; and cause the first user device to present the activity information, wherein the activity information is presented via a display of the user device.

According to some implementations, a non-transitory computer-readable medium may store one or more instructions. The one or more instructions, when executed by one or more processors of a device, may cause the one or more processors to: identify a user associated with an active user session involving a first platform, wherein the user is identified by identification information associated with a user device; determine, from a mapping associated with a blockchain, a continuity record identifier associated with the identification information; obtain, based on the continuity record identifier, activity data from a plurality of continuity records in blocks of the blockchain, wherein the activity data is associated with a previous user session, wherein the plurality of continuity records are associated with a plurality of user sessions associated with the user, and wherein one or more of the plurality of continuity records are accessible to a plurality of nodes; determine, based on the activity data, activity information associated with the active user session and the previous user session; and perform, based on the activity information, an action associated with the active user session.

According to some implementations, a method may include monitoring, by a device, a user interface associated with a user device, wherein the user interface includes a plurality of user interface objects; detecting, by the device, a user action associated with a first user interface object of the plurality of user interface objects, wherein the user action causes the user device to perform an operation associated with a first platform; determining, by the device and based on detecting the user action, activity data associated with the operation, wherein the activity data identifies an interaction involving the first user interface object in association with the operation; obtaining, by the device and based on detecting the user action, activity data associated with the user action, wherein the activity data includes identification information associated with the user device; determining, by the device, a continuity record identifier for the user action based on the identification information, wherein the continuity record identifier is associated with a distributed ledger; generating, by the device, a continuity record associated with the user action, wherein the continuity record is generated to include the continuity record identifier, and wherein the continuity record includes a hash of the activity data; and causing, by the device, the continuity record to be stored in the distributed ledger, wherein the distributed ledger includes a plurality of continuity records associated with a plurality of user actions associated with the user, and wherein one or more of the plurality of continuity records are accessible to a plurality of nodes, and wherein the plurality of continuity records permit the user session to be maintained across a plurality of different platforms.

DETAILED DESCRIPTION

Figure 1A:
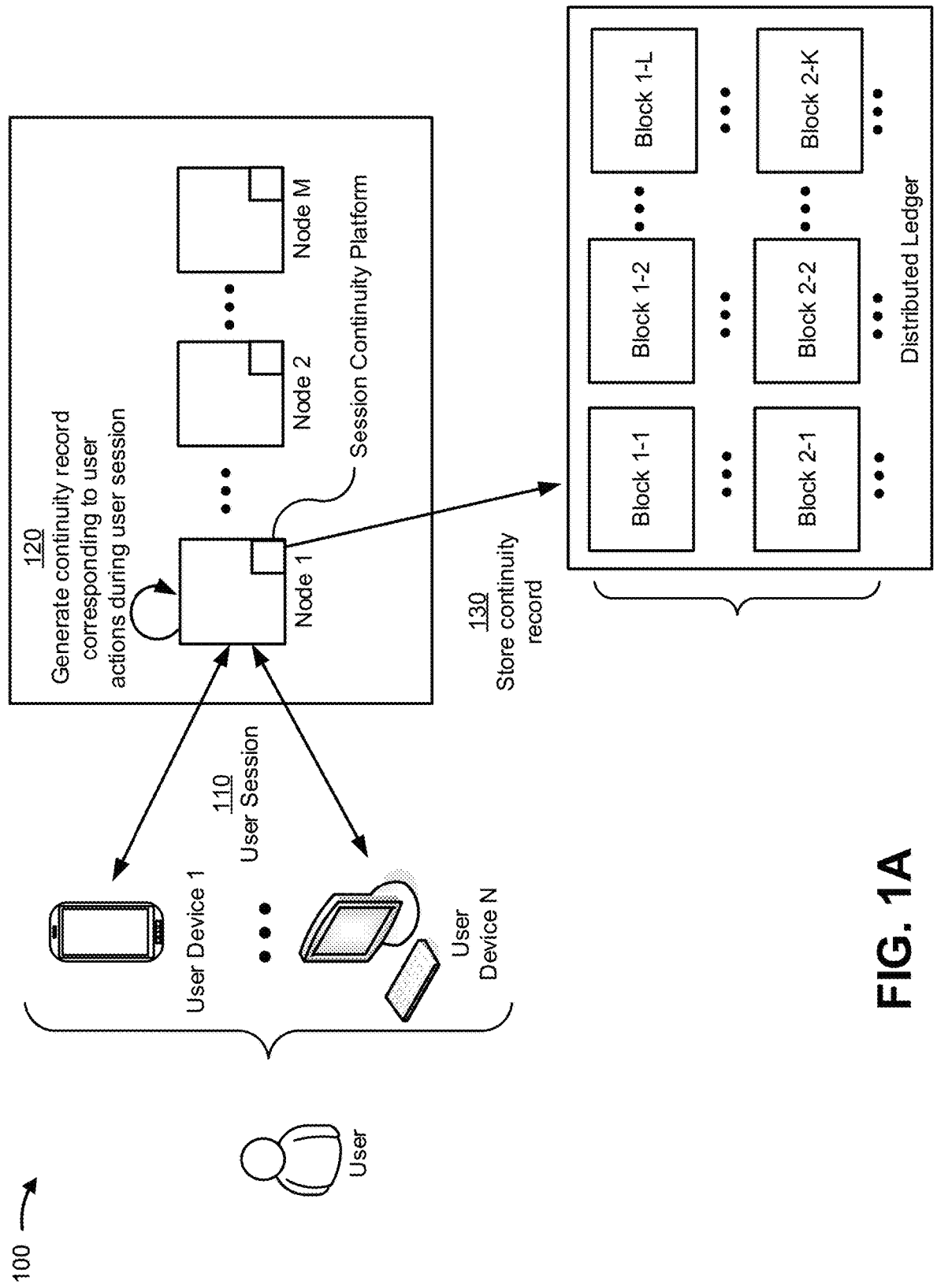
FIGS. 1A-1C are diagrams of an example implementation described herein.

The following detailed description of example implementations refers to the accompanying drawings. The same reference numbers in different drawings may identify the same or similar elements.

In many instances, a variety of different types of devices and/or platforms may be used to interact with a plurality of other devices and/or platforms to perform one or more tasks. For example, during an initial user session, a user may use an application on a user device, such as a smartphone, to perform a search, and during a subsequent user session, the user may use a browser or webpage accessed using a computer to perform another search. In some cases, the user may have the desire to effectively resume the initial user session during the subsequent user session. Referring to the search example, the user may prefer to perform a cursory or high-level search on a topic using a smartphone (which may be more readily available to the user but may be less user friendly than a computer with respect to presenting search results), and then perform a more detailed search on the topic from a computer (which may be less readily available but be considered more user friendly than a smartphone with respect to displaying the search results). As another example of a user seeking to resume a user session, the user may have the desire to begin filling out a form via an application of a user device, and then seek to complete the form via different user device or platform.

However, due to the number of various technologies that may be utilized across various devices and/or platforms (e.g., different operating systems, different communication protocols, different application protocols, different display formatting, and/or the like), the various user devices and/or platforms that can be used for such user sessions have individual, separate, and/or centralized platforms configured for the respective technologies. To permit a user (and/or another user) to resume an initiated session each of the various devices and/or platforms must send and/or receive communications between a centralized platform to permit the initiated user session to be resumed. Such communications require computing resources (e.g., processing resources, memory resources, and/or the like) to generate, provide, and/or process the communications and network resources to send or receive the communications. Moreover, in some instances, if the different devices and/or platforms are incompatible and/or incapable of communicating with each other (e.g., due to being associated with separate entities, using different communication protocols, being remotely located from each other, and/or the like), the user may not be able to effectively resume the initiated user session from a separate device and/or platform.

According to some implementations described herein, a session continuity platform may monitor a user session and track user activity associated with the user session to permit the user session to be resumed from a different user device and/or via a different platform. For example, the session continuity platform may detect a user action during a first user session (e.g., by monitoring a user interface of a first platform), determine identification information associated with the user, determine a continuity record identifier associated with the identification information, obtain activity data associated with a second user session, determine activity information associated with the user action, and cause the user device to present the activity information to permit the user to resume the first user session via the second user session.

As described herein, the session continuity platform may maintain continuity records using a distributed ledger. According to some implementations, the distributed ledger may enable a network of nodes, that have access to the distributed ledger, to access the continuity records. The network of nodes may correspond to one or more devices or platforms associated with one or more entities (e.g., devices owned, operated, and/or maintained by the one or more entities) that are authorized to access or are capable of accessing the distributed ledger. In some implementations, the network of nodes may have various levels of access capabilities that may permit the network of nodes to view (e.g., read) continuity records in the distributed ledger and/or add (e.g., write) continuity records to the distributed ledger. In this way, the session continuity platform provides accessibility (e.g., to any authorized entity or platform, from any device capable of accessing the distributed ledger, regardless of time, location, and/or the like) to information (e.g., activity information associated with a user session) in the distributed ledger.

Furthermore, the session continuity platform may use the distributed ledger to secure activity data and/or activity information associated with a user session. For example, the distributed ledger may be immutable, such that no entity or platform can edit, revise, and/or update an entry in the distributed ledger. In some implementations, the distributed ledger may be a blockchain. In such cases, the continuity records may be implemented within one or more blocks linked together in the blockchain. For example, a new transaction may be added to a block of the blockchain for a continuity record when a user action of a user session is detected (e.g., when a user interacts with a user interface, when a user input is received via a user interface, and/or the like), as described herein. In this way, the continuity records can be secured in the distributed ledger while providing transparency of a history of the user session.

In some implementations, the distributed ledger may store hundreds, thousands, millions, or more continuity records associated with hundreds, thousands, millions, or more user sessions and/or user actions of one or more users. Additionally, or alternatively, the distributed ledger may store hundreds, thousands, millions, or more continuity records associated with hundreds, thousands, millions, or more datasets that are associated with hundreds, thousands, millions, or more users. As described herein, the session continuity platform may process hundreds, thousands, millions, or more transactions for continuity records (e.g., corresponding to newly received activity data associated with the user actions). In this way, the session continuity platform, using the distributed ledger, enables management of a plurality of continuity records, regardless of the quantity of the plurality of continuity records.

Accordingly, as described herein, using a distributed ledger, the session continuity platform may maintain activity information associated with one or more user actions and/or user sessions. In some implementations, the session continuity platform may detect user actions (e.g., interactions with a user interface of a device and/or a platform) associated with a user session, determine a continuity record identifier for the user session (and/or a user of the user session), generate a continuity record for the user session, and store the continuity record in the distributed ledger. Furthermore, the continuity record, prior to being stored in the distributed ledger, may be validated by one or more authorized nodes associated with one more authorized devices and/or platforms that are associated with the user session (e.g., devices and/or platforms capable of resuming the user session, as described herein). Accordingly, via the distributed ledger, the session continuity platform enables multiple devices and/or platforms to securely generate, maintain, and/or access activity information associated with user actions of a user session, as described herein.

As described herein, to identify and/or provide information associated with a user session (or user actions of the user session), the session continuity platform may look up transactions in the distributed ledger that include a particular continuity record identifier. Accordingly, the distributed ledger may provide a scalable structure that is used to identify a user session (e.g., using a mapping of a continuity record identifier to an identification of the user session, and/or the like) and enable one or more devices or platforms to determine the activity information associated with the user session. Accordingly, the session continuity platform may avoid wasting resources associated with maintaining and/or accessing activity information using previous techniques (e.g., because the continuity records are not in relatively inaccessible data structures of centralized platforms) by enabling the activity information to be accessible to any authorized devices or platforms that are capable of accessing the distributed ledger. Furthermore, the session continuity platform may ensure efficient use of resources (e.g., data storage resources) by increasing accessibility of the activity information stored in the continuity records and/or limiting an amount of resources that may be required to store the activity information. For example, rather than storing results of a particular user action, the continuity records may store activity information associated with operations performed during the user action (which may consume less storage resources than the results of the user action).

According to some implementations, one or more actions may be performed to review and/or correct certain user actions (e.g., due to the user actions being made in error). For example, the distributed ledger may provide full traceability of user actions performed in connection with a user session. Accordingly, the distributed ledger may provide an ability to undo particular user actions by permitting one or more user devices, using the activity data and/or activity information associated with the distributed ledger, to correct and/or revise particular user actions by providing information that can be performed to reverse particular user actions. Additionally, or alternatively, the session continuity platform may permit a user interface to provide, based on the activity data and/or activity information, one or more actions that are to be performed so that a user can reverse a user action manually and/or indicate that the session continuity platform is to undo a user action.

Moreover, the session continuity platform, as described herein, removes complexity with respect to communicating and/or distributing the activity information by serving as a decentralized platform (associated with one or more nodes that have access to the distributed ledger) that enables on-demand, distributed, remote, and/or scalable access to the activity information. Accordingly, from the activity information, a device or platform that has access to the activity information, as described herein, can resume a user session that was previously initiated by a different device or platform, regardless of the technology of the different platform.

According to some implementations, the session continuity platform (e.g., once trust has been established via the blockchain), may facilitate communication between user devices via one or more other types of communication protocols other than via the blockchain. For example, the session continuity platform may facilitate establishing a communication link via Bluetooth, Wi-Fi, and/or any other suitable communication link. In this way, a first user device may notify another user device that a user action associated with a user session has been performed.

Figure 1B:
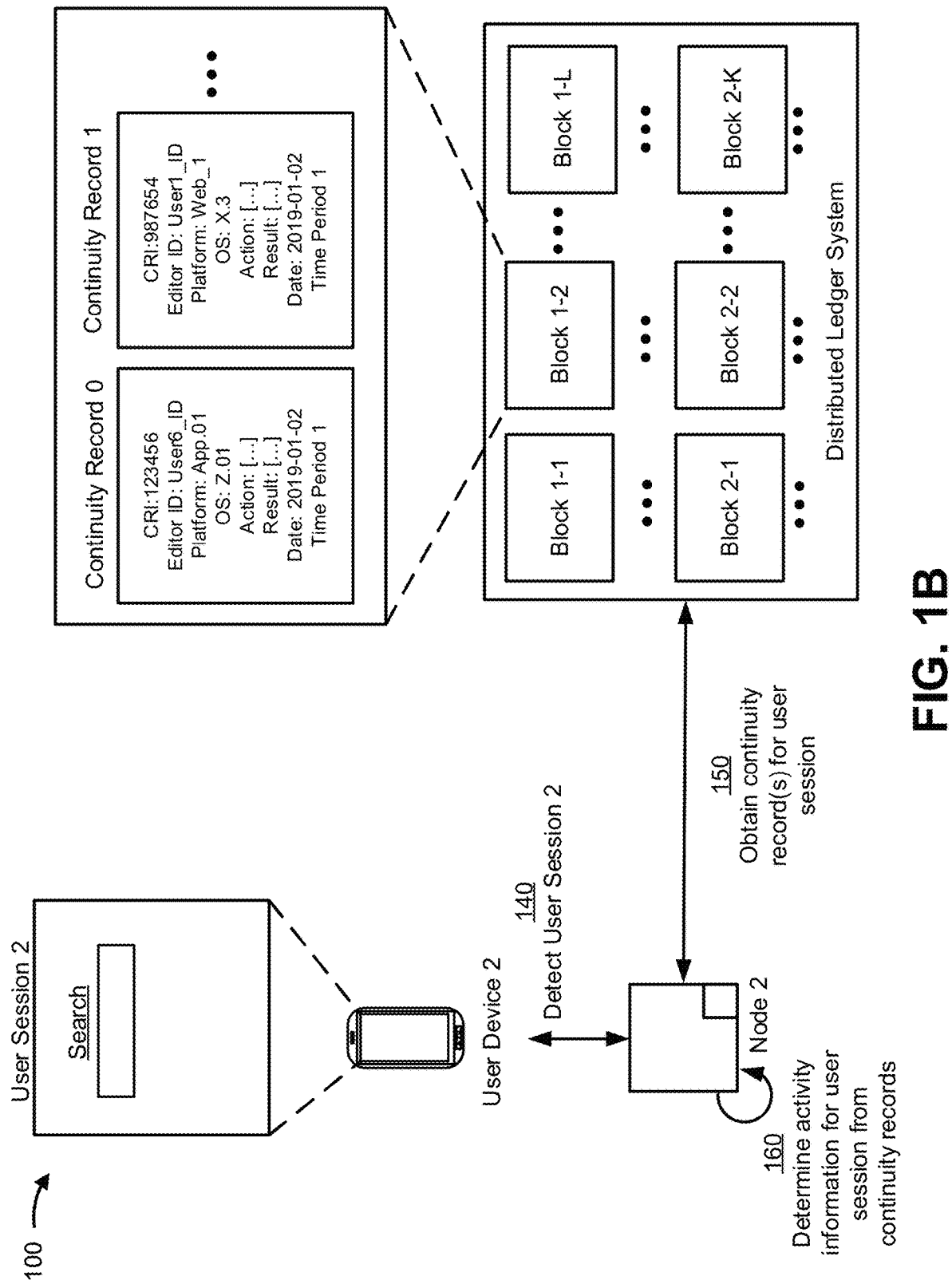
Figure 1C:
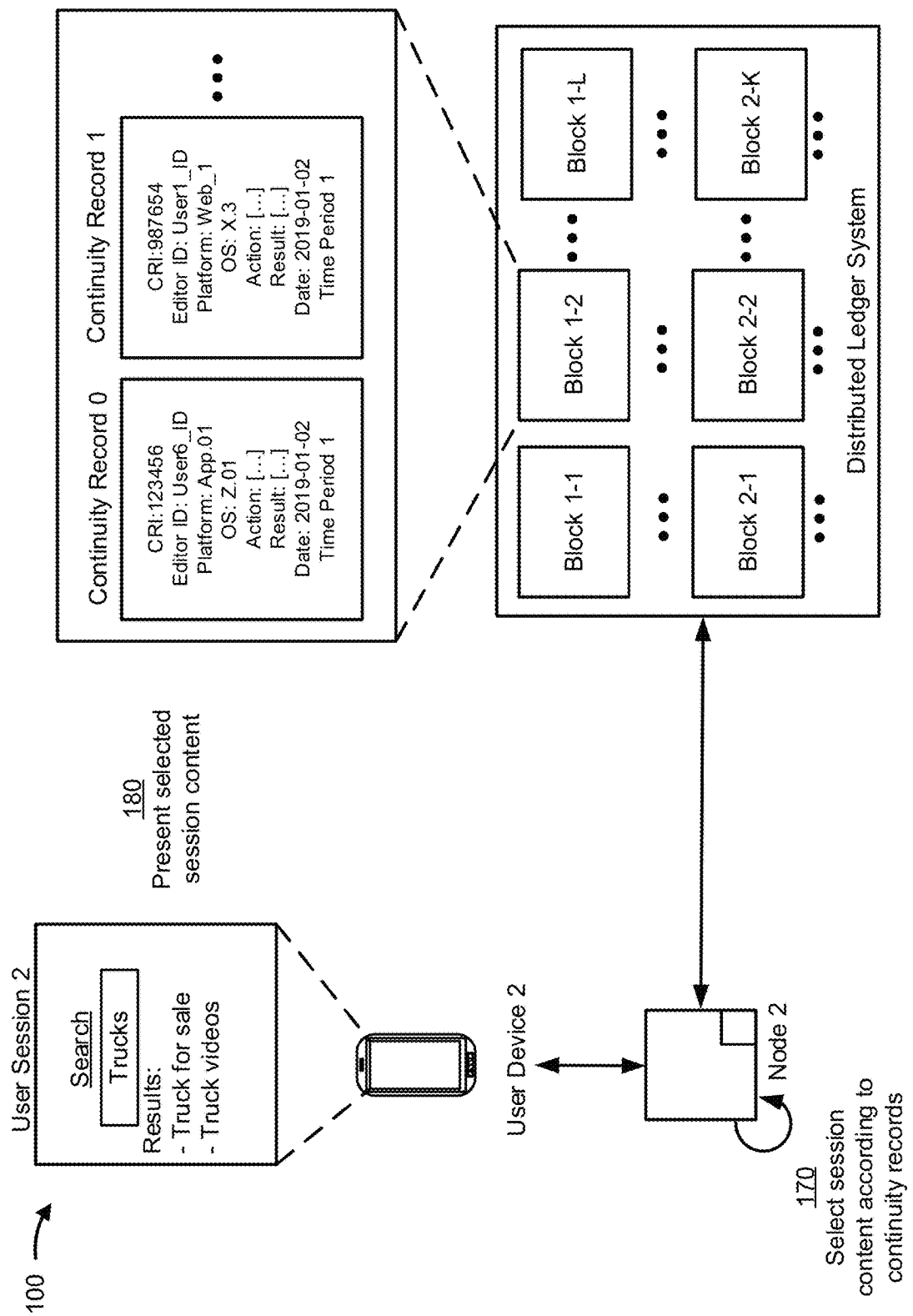

FIGS. 1A-1C are diagrams of an example implementation 100 described herein. Example implementation 100 may include one or more user devices (shown as User Device 1 through User Device N, where N corresponds to the number of user devices) (which may be referred to herein individually as a "user device" and collectively as "user devices") associated with one or more users (referred to individually as a "user" and collectively as "users"), a network of nodes (shown as Node 1, Node 2, . . . , Node M, where M corresponds to the number of nodes in the network of nodes), and a distributed ledger system. As described herein, a user device may initiate or be involved in a user session. The nodes may correspond to one or more devices and/or one or more platforms capable of hosting the user session. During the user session, a user of the user device may be performing one or more actions (referred to herein as user actions), such as interacting with a user interface of the user device (e.g., to navigate through an application, navigate through a browser, and/or the like). The nodes may track the user actions by monitoring a state of the user interface of the user device and/or interaction with one or more objects (e.g., a clickable icon, a field, a window, and/or the like) of the user interface and generating activity data and/or activity information associated with the state of the user interface or objects of the user interface, respectively. The nodes may include or be associated with a session continuity platform that maintains, via the distributed ledger, activity information associated with the user session, as described herein.

As shown in FIG. 1A, and by reference number 110, a user device is engaged in a user session with a node (Node 1) of the network of nodes. For example, the user device may be communicating with and/or accessing a platform of the node (e.g., via an application, a browser, and/or the like) to provide and/or receive session data (e.g., application data associated with an application of the node) associated with the user session. Further, the node may be communicating with and/or accessing a platform of the user device (e.g., a corresponding application, browser, and/or the like) to provide corresponding session data to the user device.

The user session may be any suitable type of user session to perform any suitable task. For example, the user session may be an application session (e.g., associated with an application of the user device and/or the node), a browsing session (e.g., associated with a browser of the user device and/or a data engine of the node), a query session (e.g., associated with a browser of the user device and a search engine of the node), a communication session (e.g., associated with a communication interface of the user device and/or a communication network of the node, and/or the like), a gaming session, and/or the like. Accordingly, the user may interact with the node via the user device during a user session, as described herein.

During the user session, the user may perform one or more user actions associated with the user device and/or the node. For example, the user may utilize one or more input components (e.g., a touchscreen, a mouse, a keyboard, a microphone, a sensor, a camera, and/or the like) of a user interface of the user device to interact with the user device and/or the node. More specifically, the user may interact with a touchscreen (e.g., by touching clickable icons of a graphical user interface (GUI) on the user device, by performing pinch motions on the touchscreen to zoom into a window of the GUI, by sliding across the screen to maneuver around a window, and/or the like), the user may interact with a button, such as a mouse button, a keyboard button, and/or one or more utility buttons of the user device (e.g., to provide a user input (e.g., by typing with a keyboard, selecting a clickable icon with a mouse, and/or the like) to unlock the user device, to adjust volume of an output of the user device, to navigate a GUI of the user device, and/or the like), the user may interact with a microphone of the user device (e.g., by speaking commands (e.g., to a digital assistant), for dictation, and/or the like). In this way, the user may perform any type of user actions to interact with the user device and/or the node during the user session.

According to some implementations, the user device may provide activity data associated with the user actions to a node. The activity data may correspond to one or more user inputs via the user interface and/or GUI of the user device. For example, the activity may include information identifying certain user inputs (e.g., associated with particular applications, browsers, user actions, user sessions, and/or the like) or all user inputs to the user device. In a relatively more granular example, the activity data may correspond to any particular, detectable user interaction between the user and the user device. For example, the activity data may correspond to a state of the user interface of the user device. The state of the user interface may indicate the status of one or more input components of the user interface (e.g., a mouse location or movement, key strokes of a keyboard, sensor measurements of sensors, location information from a location system of the user device, whether or not a voice input is being provided, and/or the like). Accordingly, the user device may be configured to stream activity data to the node (e.g., activity data associated with a particular user session) to permit the user session to receive the activity data.

In some implementations, the node (e.g., via the session continuity platform) may be configured to monitor the user interface of the user device (e.g., by monitoring the activity data). Accordingly, based on monitoring the user interface the node may detect one or more user actions performed by the user via the user device. In some implementations, the node may be configured to monitor the user interface to detect particular types of user actions (e.g., particular selections of user inputs, particular mouse maneuvers (e.g., mouse overs) with respect to certain objects of the user interface (which may be referred to herein as user interface objects), user reactions (e.g., via one or more sensors of the user device), and/or the like). Accordingly, the node may detect when a user interacts with an object, how a user interacts with an object (e.g., mousing over the user interface object, clicking the user interface object to select the user interface object, accessing a pop-up associated with the object, and/or the like), a length of time that the user interacts with the object, and/or the like. Furthermore, the session continuity platform may perform one or more particular actions (or cause one or more particular actions to be performed) to permit a user session in association with the particular types of user actions to effectively be resumed as described herein. Such actions may include one or more user defined-actions according to one or more user inputs (e.g., user inputs associated with the user or one or more other users associated with the user devices), a pre-configured set of user actions (e.g., a default set of actions, a library of pre-configured user actions, and/or the like), a platform-defined set of actions, and/or the like.

To maintain privacy of the user associated with monitoring and/or providing activity data on the user device, the user device and/or the node (e.g., via the session continuity platform) may ensure that the user opts in (e.g., via an authorization) to enable the user device and/or the node to maintain activity data associated with a user session to permit the user session to effectively be resumed in a subsequent user session, as described herein. Accordingly, the user device and/or the node may be configured to abide by any and all applicable laws with respect to maintaining the privacy of the user and/or content of the user actions. In some implementations, the user device and/or the node may anonymize and/or encrypt any private information associated with the user actions, the corresponding activity data, corresponding activity information, and/or the like. In some implementations, the user device and/or the node may have or be configured to have limited access to certain user actions, corresponding activity data, and/or corresponding activity information. For example, the user device and/or the node may be configured to only have an ability to monitor user actions associated with certain types of user sessions (e.g., that involve particular applications, browsers, tasks, and/or the like), only have an ability to monitor user actions associated with particular user devices and/or nodes, only have an ability to monitor user actions that occur in particular locations (e.g., geographical locations of the user), only have access to the activity data and/or the activity information for a threshold time (e.g., from the time of the event), only have access to a limited amount of activity data and/or activity information (e.g., corresponding a threshold quantity of user actions), and/or the like.

In this way, during a user session, the node may monitor and/or detect user actions via a user interface of the user device to permit the node and/or session continuity platform to generate a continuity record, associated with the user actions, that can be used to resume the user session.

As further shown in FIG. 1A, and by reference number 120, the node (e.g., via the session continuity platform) generates a continuity record corresponding to one or more user actions during the user session. For example, the session continuity platform may generate the continuity record based on activity data generated by and/or provided from the user device. The continuity record may include a continuity record identifier associated with the user session to permit the continuity record to be identified in association with the user session. Additionally, or alternatively, the continuity record identifier may be associated with the user to permit the continuity record to be identified in association with the user. Furthermore, the continuity record may be generated to include the activity data (and/or a hash of the activity data) associated with one or more user actions of the user session.

According to some implementations, when generating the continuity record, the node may determine a continuity record identifier for the file based on identification information associated with the user device and/or the user. The identification information is determined based on an identifier associated with the user device. For example, the identification information may be generated from and/or associated with a serial number of the user device (e.g., an international mobile equipment identity (IMEI) number, and/or the like), an address of the user device (e.g., a media access control (MAC) address, an internet protocol (IP) address, and/or the like), an account number of the user device (e.g., a subscriber account number, and/or the like), and/or the like. Additionally, or alternatively, the identification information may be generated from and/or associated with the user. For example, the identification information may be based on credentials of the user (e.g., login information of the user, such as a username and/or password, an account number, and/or the like) that may be used to access the node, personal information of the user (e.g., a name, a date of birth, a residence address, and/or the like), a biometric of the user (e.g., a fingerprint, a face, and/or the like), and/or the like.

In some implementations, the node may identify, based on the identification information associated with the user device and/or user, the continuity record identifier associated with the user session using a mapping of identification information of the user device and/or user to corresponding continuity record identifiers for the user session. In some implementations, if the mapping does not include a continuity record identifier for a user session, the node may generate a new continuity record identifier for the user session (e.g., using any suitable identifier assignment technique).

In some implementations, the node (and/or session continuity platform) may utilize one or more integration tools (e.g., an application programming interface (API), a software development kit (SDK), and/or the like) to generate the continuity record. Such an integration tool may be associated with the distributed ledger and/or be configured to interact with the distributed ledger (e.g., using one or more calls from an API and/or SDK). In some implementations, the integration tool may be configured to utilize a particular protocol associated with the node. For example, the integration tool may be configured to utilize a particular application protocol associated with a platform (e.g., an application of the node, an operating system of the node, a browser of the node, a web-based platform of the node, and/or the like), a particular communication protocol of the node, and/or the like, to receive and/or process activity data associated with a user session. Further, the integration tool may be configured to convert the activity data to a particular format for a continuity record associated with a user session. Moreover, the integration tool may enable integration with the distributed ledger and/or the user device to permit the node to access activity data in continuity records stored in the distributed ledger and convert the activity data in the continuity records to a particular format associated with the protocol of the node. Accordingly, the activity data may be stored and/or accessible by any of the nodes via the integration tool and/or the session continuity platform to permit a user session to be resumed via any of the user devices.

As described herein, the node may determine the activity data associated with a user session (and/or a user action) from user interface data associated with the user device. In some implementations, the node may extract and/or parse the activity data from one or more communications from the user device. Accordingly, the node may generate the continuity record to include information (e.g., activity information corresponding to the activity data) identifying one or more user actions performed during the user session. In this way, the continuity record may be generated to include information identifying a user input, a user interaction with a user interface, a user reaction, and/or the like.

In some implementations, the node (e.g., via the session continuity platform) may use a hash function to generate the continuity record. For example, using the hash function (e.g., a hash function that is available to each of the nodes), the node may generate the continuity record to include a hash of the continuity record identifier, the activity data, the identification information, a source identifier associated with the node, and/or the like. In this way, using the hash function, such content can be determined, from the continuity record, by the other nodes of the network of nodes.

In some implementations, the node may send a request for validation of the continuity record. For example, the request for validation may correspond to a notification that the operation was performed by the node. For example, the node may request the session continuity platform (e.g., of one or more of the other nodes in the network of nodes) to validate the activity data based on an authentication of the node (e.g., a private key, a signature, and/or the like). The authentication may indicate that the node is authorized to monitor and/or track the user session. In this way, the activity data associated with the user session may be validated to verify that the source of the continuity record is permitted to store the activity data in the distributed ledger. In some implementations, the request may include the activity data, the continuity record, a hash of the continuity record, and/or the like. In such cases, the request may permit the session continuity platform and/or one or more of the other nodes of the network of nodes to resume the user session using the activity data and/or activity information that corresponds to the activity data.

In this way, the node and/or session continuity platform may generate a continuity record to permit the continuity record to be stored in the distributed ledger and permit each of the network of nodes to determine a state of the user session.

As further shown in FIG. 1A, and by reference number 130, the node may store the continuity record in the distributed ledger. For example, the node may perform a transaction involving one or more blocks of the distributed ledger to add the continuity record to the distributed ledger. In some implementations, the node may perform the transaction to store the continuity record via a call to the distributed ledger using an integration tool (e.g., an integration tool of the session continuity platform). Such a call may be configured to create a new block in the distributed ledger according to the protocols and/or formatting of the distributed ledger.

The blocks of the distributed ledger may be sorted chronologically, sorted according to location, sorted according to authorizations, and/or the like. A block may include (e.g., store, maintain, and/or the like) one or more continuity records, and each of the continuity records in that block may be associated with one or more user actions of one or more user sessions. Accordingly, a first continuity record for a first user action of the user session may be included in block 1-1 and a second continuity record for a subsequent user action of the user session may be included in block 2-2.

In some implementations, the session continuity platform of the node may generate a continuity record using a private key. For example, the session continuity platform may sign and/or certify the continuity record using a private key associated with the user device. In such a case, the user device may have provided the private key to the node (e.g., during a registration process, during an authentication process to authenticate the user device and/or the user of the user device, and/or the like). Additionally, or alternatively, the session continuity platform may sign and/or certify the continuity record using a private key associated with the node. In such a case, the private key may correspond to a certification associated with a platform of the node. Accordingly, via the private key, the session continuity platform may certify that the continuity record was stored and/or created in association with the node (and/or a platform associated with the node). Correspondingly, one or more authorized platforms (associated with corresponding nodes of the network of nodes) may use a public key (e.g., a public key that is paired to the private key) to verify the private key. Accordingly, the authorized platforms may verify that the continuity record was generated and/or stored by the node. Furthermore, using the private key/public key pair, the authorized platforms may certify that the continuity records are authenticated and/or certified by a trusted platform.

In some implementations, the node may store the continuity record (and/or cause the session continuity platform to store the continuity record) based on the continuity record being validated by one or more nodes of the network of nodes (e.g., using a private/public key pair of the node). For example, based on a response to a notification transmitted to one or more of the network of nodes, that indicates that the continuity record has been validated, the node may correspondingly store the continuity record in the distributed ledger. Accordingly, the activity data of the user action and/or user session may be verified prior to being immutably stored in a continuity record of the distributed ledger.

In this way, the session continuity platform may maintain one or more continuity records for the user session in the distributed ledger to provide secure and scalable accessibility to activity data associated with user actions of the user session. Accordingly, any authorized platforms that are communicatively coupled with the distributed ledger and authorized to access the continuity records can access the activity data to resume the user session at a different time or via a different user device and/or platform.

As shown in FIG. 1B, and by reference number 140, a node (Node 2) detects a user session (referred to in the following examples as "user session 2") associated with a user device (referred to in the following examples "user device 2"). User session 2 may be subsequent to one or more user sessions associated with a user session 110 (referred to in the following examples as "user session 1") performed by a user device (referred to in the following examples as "user device 1") described in connection with FIG. 1A.

As shown in FIG. 1B, user session 2 may involve a user performing one or more user actions associated with performing a search. For example, the user may have opened a search application, a webpage of a search engine, a search interface of the user device, and/or the like. In other examples, user session 2 may be associated with one or more other types of user sessions.

As described herein, the node may have detected user session 2 based on receiving and/or analyzing activity data indicating that the user performed a particular user action associated with performing the search (e.g., a user action associated with a particular user interface object used to perform the search, such as a query field, a search button, and/or the like). For example, the node may analyze user interface data in the activity data to determine whether the user interacted with a user interface of the user device in a particular manner to initiate or continue user session 2. Furthermore, the node may determine that the activity data is associated with a particular type of user session (e.g., a search operation) that is to be resumed by the node (e.g., based on the user authorizing the node to resume the user session, based on the node being configured to resume the user session, and/or the like).

In some implementations, user device 2 may be the same device as user device 1. Additionally, or alternatively, user device 2 may be a different device from user device 1. For example, user device 2 may operate via a different platform than user device 1. More specifically, user device 2 may use a different operating system than user device 1, user device 2 may use a different application than user device 1, user device 2 may use a user device application (e.g., a mobile application) and user device 1 may use a web-based application, and/or the like.

In this way, the node may detect user session 2 to permit the node to perform one or more actions to utilize user session 2 to effectively resume user session 1 for the user.

As further shown in FIG. 1B, and by reference number 150, the node may obtain one or more continuity records for user session 2. For example, the one or more continuity records may be associated with and/or generated based on user session 1. Additionally, or alternatively, the node may obtain continuity records associated with the user (e.g., any continuity records associated with any user sessions that are associated with the user). To obtain the continuity records, the node may determine the continuity record identifier for user session 1 (e.g., using a mapping of the identification information for user session 1 to continuity record identifiers of the continuity records), and access blocks of the distributed ledger that include continuity records having that continuity record identifier. Based on the determined continuity record identifier associated with user session 1, the node may identify blocks of a blockchain of the distributed ledger that include the continuity record identifier. In some implementations, the one or more continuity records may be most recently generated and/or stored continuity records in the distributed ledger (e.g., which may be stored in most recently created blocks of the distributed ledger). For example, the one or more continuity records may correspond to continuity records that were stored since user session 1 was initiated (and/or since the user authorized the node to resume user sessions involving the user).

In some implementations, the node may obtain the continuity records based on detecting particular characteristics of user session 2. For example, the node may detect, from the user interface data, that the user opened a search window of an application or browser, started typing in a search field, verbally requested a search via a microphone, and/or the like. Based on identifying such a user action, the node may determine whether any previous user sessions (or user sessions within a threshold time period) were associated with performing a search. Further, the node may analyze the activity data of user session 2 to determine whether or not user session 2 is related to a user session 1 (which may have involved a related search on a same or similar topic). For example, assuming that the user performed a previous search, during user session 1, using a query that included the word "trucks" (e.g., to obtain information associated with trucks), the node may detect, from activity data associated with user session 2, that user session 2 is associated with a same or similar search for trucks. More specifically, the node may determine, from the activity data, that the user performed a user action involving searching for "trucks for sale" or accessing a webpage that included information on "trucks." Based on identifying such a user action, the node may determine that user session 2 is to effectively resume user session 1 (e.g., to enable the user to start user session 2 from where the user ended user session 1).

From the one or more continuity records, the node may obtain activity data associated with user session 1. As described herein, the activity data may identify one or more user actions performed via a user interface of a user device during user session 1. In this way, the node may identify activity information associated with user session 1, which may correspond to information associated with results of one or more of the user actions performed during the user session, as described herein. In some implementations, the node may cause the user device to prompt the user to request whether the user would like to resume a previous session. In such cases, the node may obtain the continuity records based on a user input responding to the prompt.

In this way, the node may obtain the continuity records to determine activity information associated with user session 1 to permit the user to resume user session 1 via user session 2.

As further shown in FIG. 1B, and by reference number 160, the node determines activity information for the user session from the continuity records. The activity information may correspond to the activity data. For example, the activity information may include information that is received, generated, processed, and/or output as a result of one or more user actions associated with the activity data. The activity information may include information associated with one or more user interface objects (e.g., fields, display windows, and/or the like) of a GUI of user device 2. Accordingly, the activity information may include information that is to be displayed via a user interface of user device 2 to permit the user to resume user session 1 via user device 2.

According to some implementations, the node may determine the activity information based on a data format of the activity data and a data format associated with the first platform. For example, the node may determine the data format from the continuity record and perform one or more conversions of the activity data (e.g., to a data format associated with node 2 and/or user device 2) to determine the activity information that is to be displayed. In this way, the node may be able to convert the data from a format associated with a platform of user session 1 to a format associated with user session 2.

According to some implementations, the node, based on determining the activity information, may cause the activity information to be presented via user device 2 to permit the user to resume user actions associated with user session 1. For example, the activity information can be presented and/or included in association with a user interface object of user device 2. More specifically, the node may cause a search query to be entered into a search field (e.g., of a GUI) displayed via the user interface, a text inserted into a field of a form during user session 1 to be input into a corresponding field of a form in user session 2, and/or the like.

In this way, the node may determine the activity information associated with user session 1 and perform one or more actions to present the activity information via a user interface of user device 2 to permit the user to resume user session 1 via user device 2.

As shown in FIG. 1C, and by reference number 170, the node selects session content according to the continuity records. The session content may correspond to information that can be derived from an analysis of the activity data in the continuity records and/or the activity information determined from the activity data, as described herein. For example, the session content may correspond to information that may be of interest to the user (e.g., based on one or more patterns associated with the user actions and/or user sessions involving the user). In such cases, the session content may be determined based on performing one or more analyses of the continuity records to determine content that may be of interest to the user and/or predict that the user may have a desire to interact with one or more features or content during user session 2.

In some implementations, the node (e.g., based on detecting that the user is associated with user session 2) may detect, based on the activity data, a pattern of behavior of the user during a plurality of user sessions associated with a user and/or a plurality of user actions associated with the plurality of user sessions. For example, the node may utilize a machine learning model, such as a behavioral analytics model, trained to classify historical activity data associated with the user using one or more machine learning techniques. The behavioral analytics platform may obtain activity data, from continuity records associated with the user, that relate to user actions (e.g., which may indicate behavior vectors that are based on historical user activity data in the continuity records), and the activity data may be input to the behavior analytics model to determine one or more behavioral categories, sub-categories, and/or the like for the user. In some implementations, the node, using the behavioral analytics model, may identify one or more matches for the user based on patterns within and/or affinities between the behavioral categories, sub-categories, and/or the like in which other users are classified. In this way, by identifying potential matches based on behavioral data that is derived from user actions in the activity data, such behavioral categories, sub-categories, and/or the like may be mapped to corresponding information associated with the user actions and/or user sessions. In some implementations, the behavior analytics model may operate in a background of user session 1 and/or user session 2, between user session 1 and/or user session 2, and/or the like. In this way, the node may identify, based on the determined user behavior, a particular pattern of user actions that may indicate a likelihood that the user is likely interested in particular session content.

In this way, the node may select, based on the activity information and/or a pattern of behavior identified from the activity, session content for user session 2 to permit the user to access the session content.

As further shown in FIG. 1C, and by reference number 180, the node may cause the session content to be displayed via the user interface of user device 2. For example, the node may cause the session content to be displayed in a similar manner as the activity information associated with the activity data (e.g., based on protocol conversion, user interface object format, and/or the like).

In some implementations, the node may cause the session content to be displayed via facilitating a communication (e.g., via a Bluetooth connection, a Wi-Fi connection, and/or the like) between user device 1 and user device 2. In this way, the user (and/or multiple users) may use user device 1 and/or user device 2 to resume a user session (e.g., in a manner that is not reliant on a specific tool). Additionally, or alternatively, the session continuity platform may cause and/or enable the user device 1 to remotely perform actions on user device 2 (e.g., if user device 2 is configured to take such actions upon detecting a new blockchain transactions associated with remotely performing the actions). For example, the user device 1 may correspondingly perform the actions on user device 2 after user device 2 is updated with the activity information associated with the continuity records of the user actions.

Additionally, or alternatively, user device 2 may correct and/or revise any of the user actions based on the activity data and/or activity information associated with the continuity records. For example, user device 2, based on instructions from a user of user device 2, may undo one or more of the user actions associated with the continuity records (e.g., according to one or more corresponding user interface actions). In this way, the user session can be resumed and/or corrected according to the activity data in the continuity records for a user action.

In this way, the node may present session content to permit the user to access the session content and/or facilitate completion of the resumed user session 1 via user session 2. In such cases, computing resources and/or network resources associated with the user having to navigate and/or identify the session content (without the assistance of the node and/or behavior analytics model) can be conserved.

As indicated above, FIGS. 1A-1C are provided as one or more examples. Other examples may differ from what is described with regard to FIGS. 1A-1C.

Figure 2:
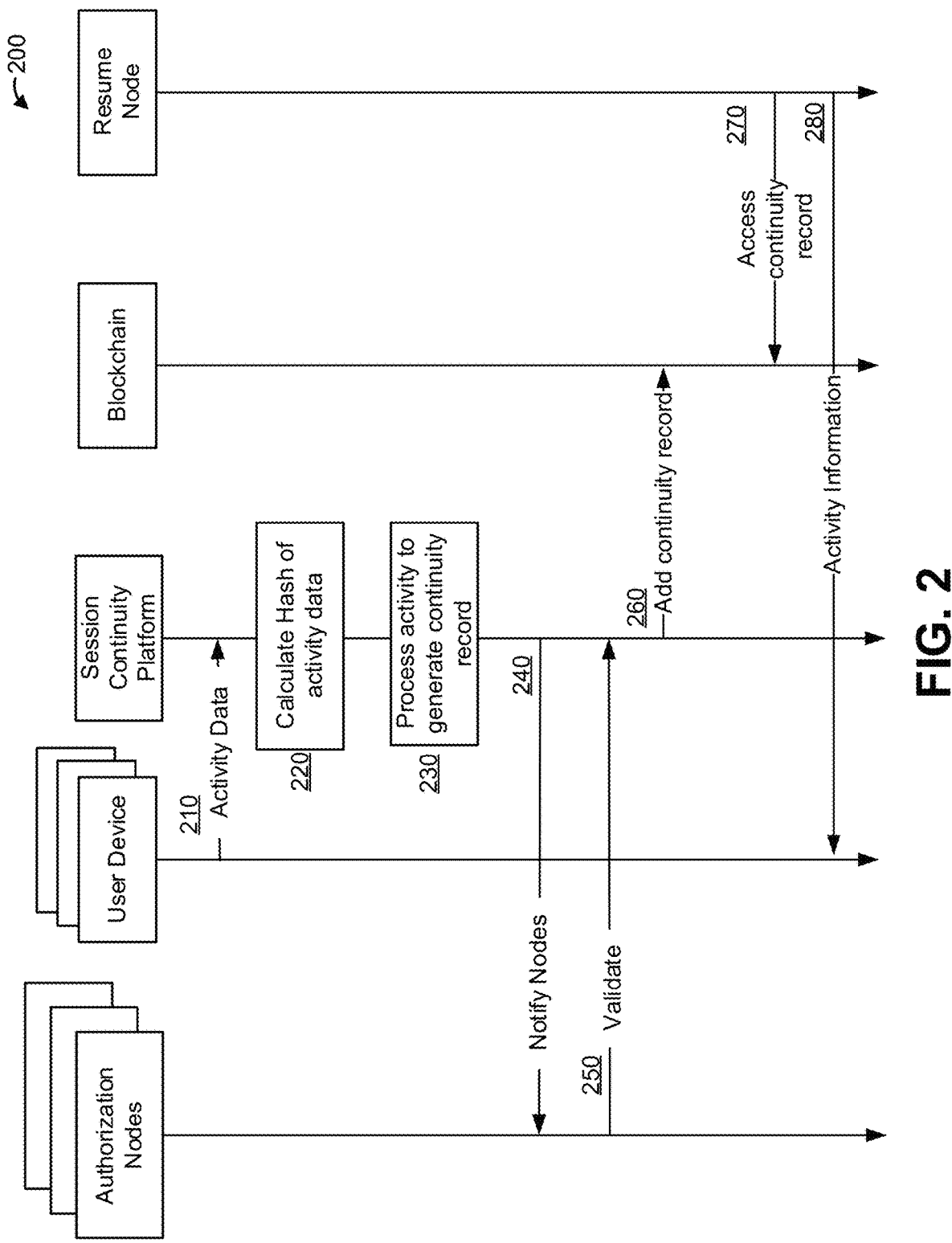
FIG. 2 is a diagram of an example call flow associated with an example implementation described herein.

FIG. 2 is a diagram of an example call flow associated with an example implementation 200 described herein. Example implementation 200 includes one or more authorization nodes, one or more user devices (which may correspond to one or more of the user devices of example implementation 100), a session continuity platform (which may correspond to the session continuity platform of example implementation 100), a blockchain, and a resume node (which may correspond to one or more of the nodes of example implementation 100). The session continuity platform may be associated with one or more of the authorization nodes.

As shown in FIG. 2, and by reference number 210, a user device provides activity data to the session continuity platform. To detect a user action associated with the activity data, the session continuity platform may obtain activity data associated with the user action. In some implementations, the session continuity platform may receive the activity data via one of the authorization nodes that hosts a user session associated with the activity data. As shown by reference number 220, the session continuity platform may calculate a hash of the activity data (e.g., using a hash function available to the authorization nodes). As shown by reference number 230, the session continuity platform may process the activity data to generate a continuity record, as described herein.

As further shown in FIG. 2, and by reference number 240, the session continuity platform may notify the authorization nodes of the generated continuity record. For example, the session continuity platform may send a request to the authorization nodes to validate the continuity record (e.g., based on an authentication from the node associated with the user device and/or the session continuity platform). The session continuity platform may receive the validation, as shown by reference number 250, and add the generated continuity record to the blockchain, as shown by reference number 260.

As further shown in FIG. 2, and by reference number 270, the resume node may receive and/or access the continuity record. As shown by reference number 280, the resume node may then provide activity information associated with the activity data in the continuity record to permit the user device (or a different user device) to resume the user session.

In this way, the session continuity platform may use the blockchain to store activity data associated with a user session (and/or user actions during the user session) involving a node, have one or more nodes validate the activity data associated with the user session, and permit one or more other nodes to access the activity data to permit a user session to be resumed (e.g., by performing corresponding operations of the activity data that are included in the continuity record or presenting activity information associated with the activity data).

As indicated above, FIG. 2 is provided merely as an example. Other examples may differ from what is described with regard to FIG. 2.

In this way, some implementations described herein provide a session continuity platform to enable various user devices that use various technologies and/or various platforms during user sessions to resume a particular user session regardless of the technology or platform used during the user session. In this way, access to user actions associated with a user session can be readily accessible to a network of nodes that are authorized to access the user actions and/or monitor the user actions during a user session, as described herein. Furthermore, the examples associated with the session continuity platform and/or distributed ledger described herein may conserve computing resources and/or network resources associated with resuming user sessions (e.g., by preventing the need to reperform one or more user actions to resume the user session and/or perform additional user actions to identify content of interest).

Figure 3:
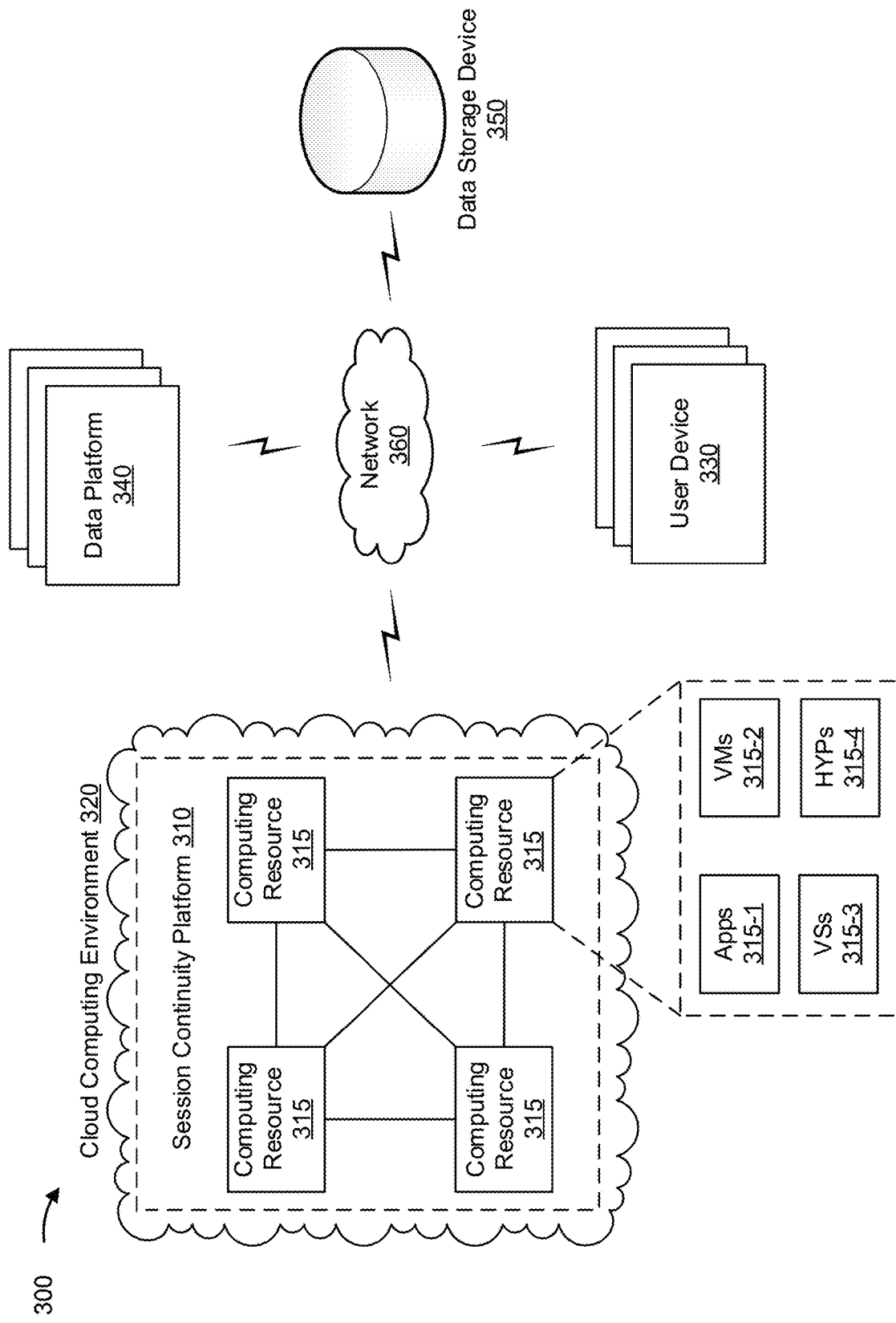
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a session continuity platform 310, a computing resource 315, a cloud computing environment 320, one or more user devices 330 (referred to herein individually as user device 330 or collectively as user devices 330), a data platform 340, a data storage device 350, and a network 360. Devices of environment 300 may interconnect via wired connections, wireless connections, or a combination of wired and wireless connections.

Session continuity platform 310 includes one or more computing resources that may monitor for and/or detect user actions of a user session to permit a user session to be resumed as described herein. For example, session continuity platform 310 may be a platform implemented by cloud computing environment 320 that may receive activity information associated with user actions of a user session, generate a continuity record associated with the one or more user actions (and/or user session), and store the continuity record in a distributed ledger to permit the user session to by resumed. In some implementations, session continuity platform 310 is implemented by computing resources 315 of cloud computing environment 320.

Session continuity platform 310 may include a server device or a group of server devices. In some implementations, session continuity platform 310 may be hosted in cloud computing environment 320. Notably, while implementations described herein may describe session continuity platform 310 as being hosted in cloud computing environment 320, in some implementations, session continuity platform 310 may be non-cloud-based or may be partially cloud-based.

Cloud computing environment 320 includes an environment that delivers computing as a service, whereby shared resources, services, and/or the like may be provided to user devices 330. Cloud computing environment 320 may provide computation, software, data access, storage, and/or other services that do not require end-user knowledge of a physical location and configuration of a system and/or a device that delivers the services. As shown, cloud computing environment 320 may host session continuity platform 310 and computing resource 315.

Computing resource 315 includes one or more personal computers, workstation computers, server devices, or another type of computation and/or communication device. In some implementations, computing resource 315 may host session continuity platform 310. The cloud resources may include compute instances executing in computing resource 315, storage devices provided in computing resource 315, data transfer devices provided by computing resource 315, and/or the like. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by user device 330. Application 315-1 may eliminate a need to install and execute the software applications on user device 330. For example, application 315-1 may include software associated with session continuity platform 310 and/or any other software capable of being provided via cloud computing environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system. A process virtual machine may execute a single program and may support a single process. In some implementations, virtual machine 315-2 may execute on behalf of a user (e.g., user device 330), and may manage infrastructure of cloud computing environment 320, such as data management, synchronization, or long-duration data transfers.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems and may manage the execution of the guest operating systems. Multiple instances of a variety of operating systems may share virtualized hardware resources.

User device 330 includes one or more devices capable of receiving, generating, storing, processing, and/or providing information associated with user actions of a user session. For example, user device 330 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Data platform 340 includes one or more platforms that may host a user session as described herein. The data platform 340 may be any platform that is communicatively coupled to user devices 330. For example, the data platform 340 may be an online platform (e.g., a web-based platform), a cloud-based platform, a non-cloud-based platform, and/or the like that can be used to host an application, a browser, a game, and/or the like. Data platform 340 may be associated with a search engine, a form filling application, a gaming application, a document processing application, a data management application, a data analytics application, a machine learning application, a data stream application, and/or the like.

Data storage device 350 may include one or more devices capable of receiving, generating, storing, processing, and/or providing information associated with a user session. For example, data storage device 350 may include a computing device, such as a server, a desktop computer, a laptop computer, a tablet computer, a handheld computer, or a similar device. Data storage device 350 may support a distributed ledger system that uses a data structure (e.g., a blockchain) to store continuity records associated with datasets managed by session continuity platform 310, as described herein.

Network 360 includes one or more wired and/or wireless networks. For example, network 360 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
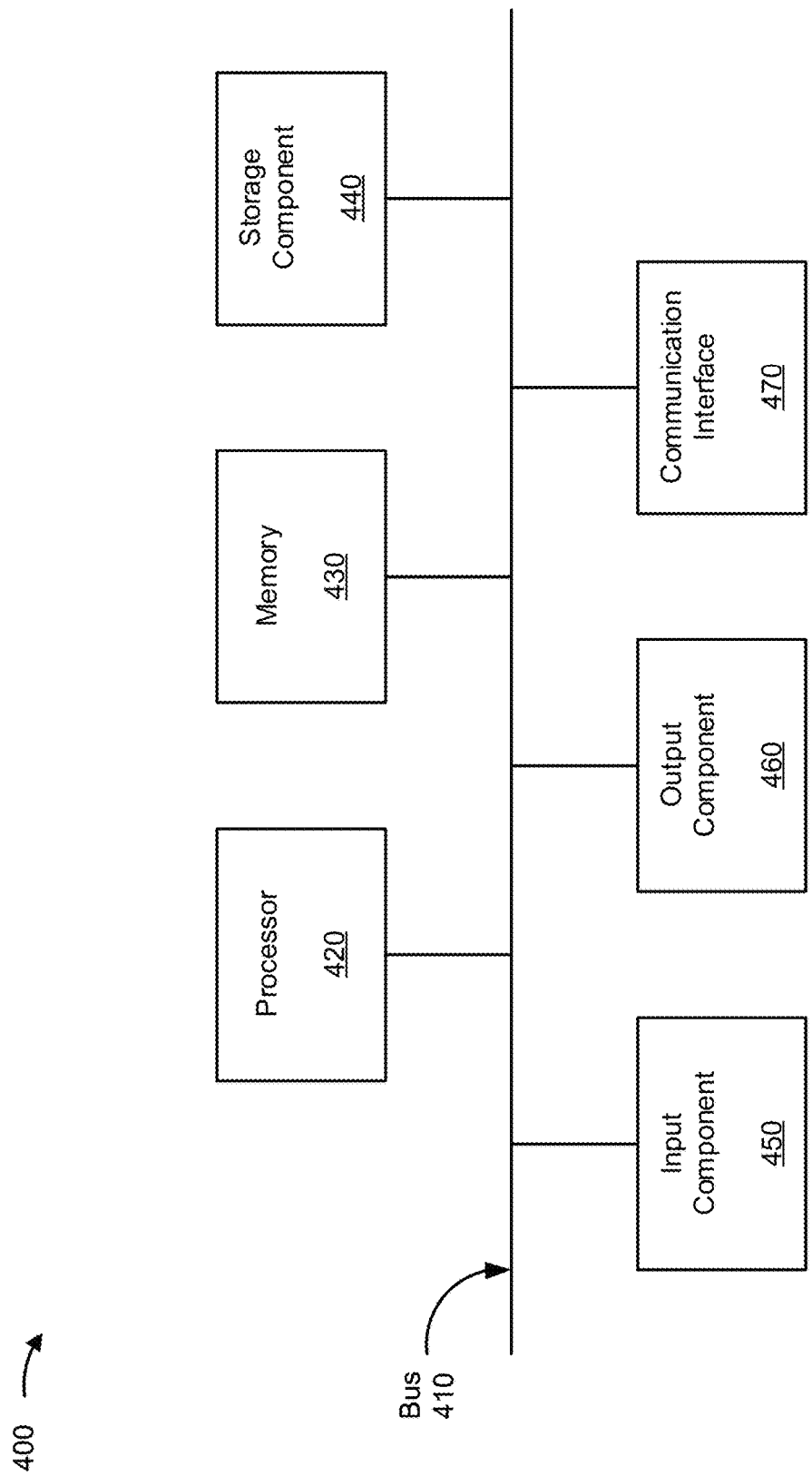
FIG. 4 is a diagram of example components of one or more devices of FIG. 3.

FIG. 4 is a diagram of example components of a device 400. Device 400 may correspond to session continuity platform 310, computing resource 315, user device 330, data platform 340, and/or data storage device 350. In some implementations, session continuity platform 310, computing resource 315, user device 330, data platform 340, and/or data storage device 350 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
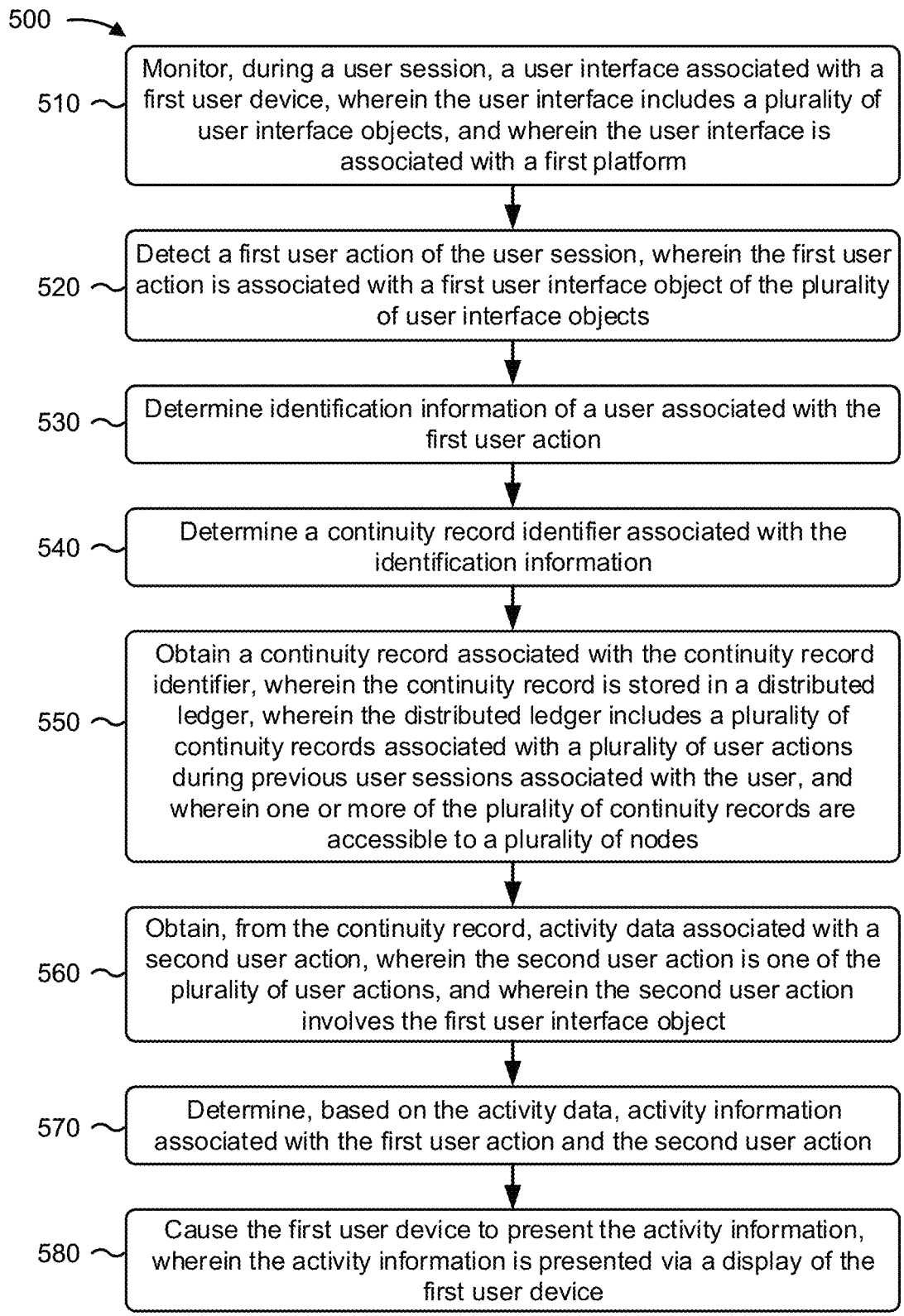
FIG. 5-8 are flowcharts of one or more example processes for maintaining user session continuity across multiple devices and/or multiple platforms.

FIG. 5 is a flowchart of an example process 500 for maintaining user session continuity across multiple devices and/or multiple platforms. In some implementations, one or more process blocks of FIG. 5 may be performed by a session continuity platform (e.g., session continuity platform 310). In some implementations, one or more process blocks of FIG. 5 may be performed by another device or a group of devices separate from or including the session continuity platform, such as a computing resource (e.g., computing resource 315), a user device (e.g., user device 330), a data platform (e.g., data platform 340), a data storage device (e.g., data storage device 350), and/or the like.

As shown in FIG. 5, process 500 may include monitoring, during a user session, a user interface associated with a first user device, wherein the user interface includes a plurality of user interface objects and wherein the user interface is associated with a first platform (block 510). For example, the session continuity platform (e.g., using processor 420, memory 430, storage component 440, input component 450, output component 460, communication interface 470 and/or the like) may monitor, during a user session, a user interface associated with a first user device wherein the user interface includes a plurality of user interface objects, as described above. In some implementations, the user interface includes a plurality of user interface objects. In some implementations, the user interface is associated with a first platform.

As further shown in FIG. 5, process 500 may include detecting a first user action of the user session, wherein the first user action is associated with a first user interface object of the plurality of user interface objects (block 520). For example, the session continuity platform (e.g., using processor 420, memory 430, storage component 440, input component 450, output component 460, communication interface 470 and/or the like) may detect a first user action of the user session, as described above. In some implementations, the first user action is associated with a first user interface object of the plurality of user interface objects.

As further shown in FIG. 5, process 500 may include determining identification information of a user associated with the first user action (block 530). For example, the session continuity platform (e.g., using processor 420, memory 430, storage component 440, input component 450, output component 460, communication interface 470 and/or the like) may determine identification information of a user associated with the first user action, as described above.

As further shown in FIG. 5, process 500 may include determining a continuity record identifier associated with the identification information (block 540). For example, the session continuity platform (e.g., using processor 420, memory 430, storage component 440, input component 450, output component 460, communication interface 470 and/or the like) may determine a continuity record identifier associated with the identification information, as described above.

As further shown in FIG. 5, process 500 may include obtaining a continuity record associated with the continuity record identifier, wherein the continuity record is stored in a distributed ledger, wherein the distributed ledger includes a plurality of continuity records associated with a plurality of user actions during previous user sessions associated with the user and one or more of the plurality of continuity records are accessible to a plurality of nodes (block 550). For example, the session continuity platform (e.g., using processor 420, memory 430, storage component 440, input component 450, output component 460, communication interface 470 and/or the like) may obtain a continuity record associated with the continuity record identifier, as described above. In some implementations, the continuity record is stored in a distributed ledger. In some implementations, the distributed ledger includes a plurality of continuity records associated with a plurality of user actions during previous user sessions associated with the user. In some implementations, one or more of the plurality of continuity records are accessible to a plurality of nodes.

As further shown in FIG. 5, process 500 may include obtaining, from the continuity record, activity data associated with a second user action, wherein the second user action is one of the plurality of user actions and the second user action involves the first user interface object (block 560). For example, the session continuity platform (e.g., using processor 420, memory 430, storage component 440, input component 450, output component 460, communication interface 470 and/or the like) may obtain, from the continuity record, activity data associated with a second user action, as described above. In some implementations, the second user action is one of the plurality of user actions. In some implementations, the second user action involves the first user interface object.

As further shown in FIG. 5, process 500 may include determining, based on the activity data, activity information associated with the first user action and the second user action (block 570). For example, the session continuity platform (e.g., using processor 420, memory 430, storage component 440, input component 450, output component 460, communication interface 470 and/or the like) may determine, based on the activity data, activity information associated with the first user action and the second user action, as described above.

As further shown in FIG. 5, process 500 may include causing the first user device to present the activity information, wherein the activity information is presented via a display of the first user device (block 580). For example, the session continuity platform (e.g., using processor 420, memory 430, storage component 440, input component 450, output component 460, communication interface 470 and/or the like) may cause the first user device to present the activity information, as described above. In some implementations, the activity information is presented via a display of the first user device.

Process 500 may include additional implementations, such as any single implementation or any combination of implementations described below and/or in connection with one or more other processes described elsewhere herein.

In a first implementation, the second user action is performed via a second platform that is different from the first platform. In a second implementation, alone or in combination with the first implementation, at least one of: the first platform is a first operating system and the second platform is a second operating system that is different from the first operating system, the first platform is a first application and the second platform is a second application that is different from the first application, or the first platform is a user device application and the second platform is a web-based application.

In a third implementation, alone or in combination with one or more of the first and second implementations, the continuity record identifier is determined using a mapping of a plurality of user identities and a plurality of continuity record identifiers. In a fourth implementation, alone or in combination with one or more of the first through third implementations, the identification information is determined based on an identifier associated with the user device. In a fifth implementation, alone or in combination with one or more of the first through fourth implementations, the second user action is performed via a second user device that is different from the first user device, and the first user device and the second user device are nodes of the plurality of nodes.

In a sixth implementation, alone or in combination with one or more of the first through fifth implementations, the distributed ledger comprises a blockchain. In a seventh implementation, alone or in combination with one or more of the first through sixth implementations, the user interface is a first user interface, and the activity information is caused to be presented based on a conversion of the activity data to a first protocol associated with the first user interface from a second protocol associated with a second user interface that is used to perform the second user action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
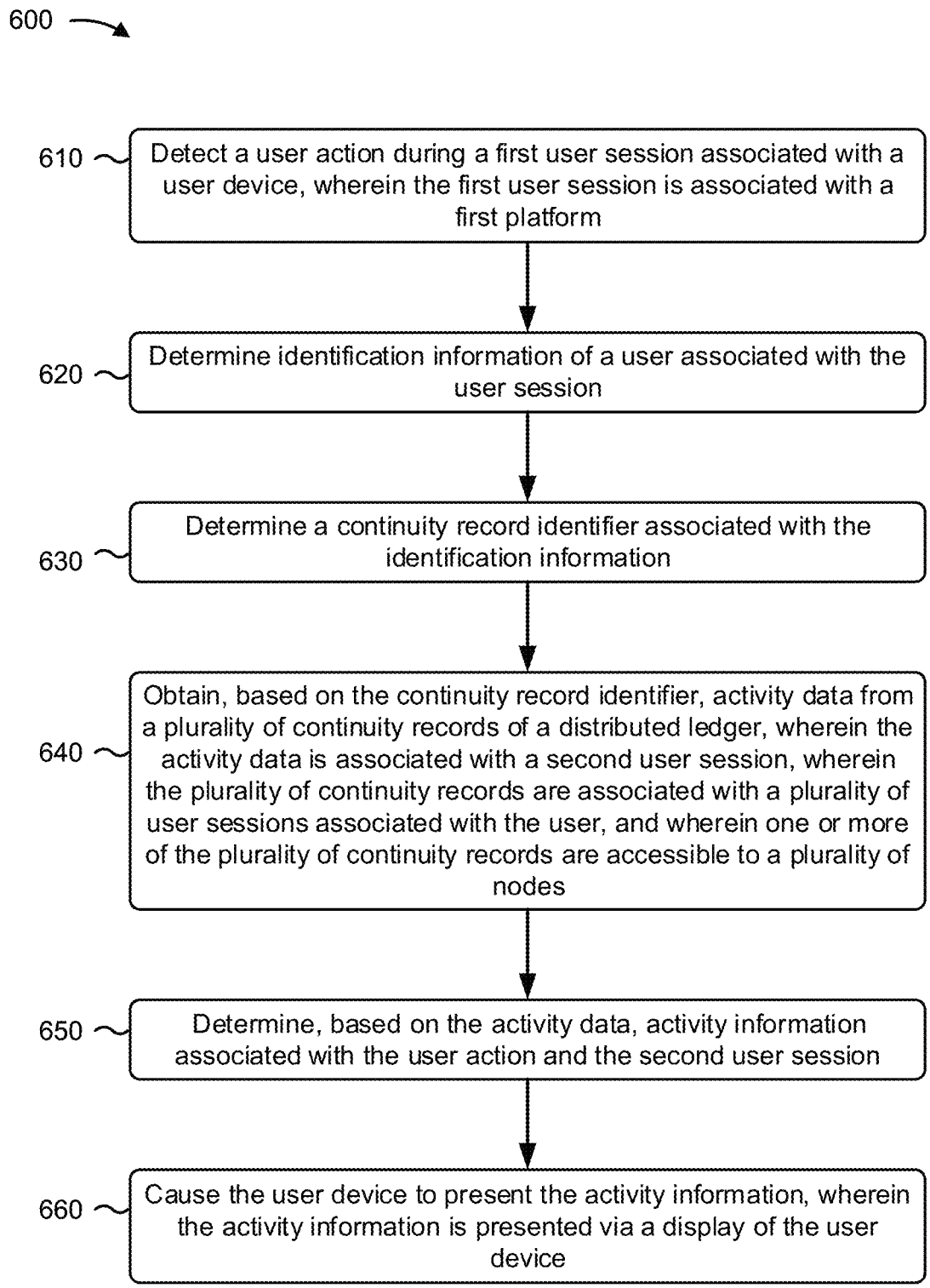

FIG. 6 is a flowchart of an example process 600 for maintaining user session continuity across multiple devices and/or multiple platforms. In some implementations, one or more process blocks of FIG. 6 may be performed by a session continuity platform (e.g., session continuity platform 310). In some implementations, one or more process blocks of FIG. 6 may be performed by another device or a group of devices separate from or including the session continuity platform, such as a computing resource (e.g., computing resource 315), a user device (e.g., user device 330), a data platform (e.g., data platform 340), a data storage device (e.g., data storage device 350), and/or the like.

As shown in FIG. 6, process 600 may include detecting a user action during a first user session associated with a first user device, wherein the first user session is associated with a first platform (block 610). For example, the session continuity platform (e.g., using processor 420, memory 430, storage component 440, input component 450, output component 460, communication interface 470 and/or the like) may detect a user action during a first user session associated with a first user device, as described above. In some implementations, the first user session is associated with a first platform.

As further shown in FIG. 6, process 600 may include determining identification information of a user associated with the user session (block 620). For example, the session continuity platform (e.g., using processor 420, memory 430, storage component 440, input component 450, output component 460, communication interface 470 and/or the like) may determine identification information of a user associated with the user session, as described above.

As further shown in FIG. 6, process 600 may include determining a continuity record identifier associated with the identification information (block 630). For example, the session continuity platform (e.g., using processor 420, memory 430, storage component 440, input component 450, output component 460, communication interface 470 and/or the like) may determine a continuity record identifier associated with the identification information, as described above.

As further shown in FIG. 6, process 600 may include obtaining, based on the continuity record identifier, activity data from a plurality of continuity records of a distributed ledger, wherein the activity data is associated with a second user session, wherein the plurality of continuity records are associated with a plurality of user sessions associated with the user, and wherein one or more of the plurality of continuity records are accessible to a plurality of nodes (block 640). For example, the session continuity platform (e.g., using processor 420, memory 430, storage component 440, input component 450, output component 460, communication interface 470 and/or the like) may obtain, based on the continuity record identifier, activity data from a plurality of continuity records of a distributed ledger, as described above. In some implementations, the activity data is associated with a second user session. In some implementations, the plurality of continuity records are associated with a plurality of user sessions associated with the user. In some implementations, one or more of the plurality of continuity records are accessible to a plurality of nodes.

As further shown in FIG. 6, process 600 may include determining, based on the activity data, activity information associated with the user action and the second user session (block 650). For example, the session continuity platform (e.g., using processor 420, memory 430, storage component 440, input component 450, output component 460, communication interface 470 and/or the like) may determine, based on the activity data, activity information associated with the user action and the second user session, as described above.

As further shown in FIG. 6, process 600 may include causing the first user device to present the activity information, wherein the activity information is presented via a display of the first user device (block 660). For example, the session continuity platform (e.g., using processor 420, memory 430, storage component 440, input component 450, output component 460, communication interface 470 and/or the like) may cause the first user device to present the activity information, as described above. In some implementations, the activity information is presented via a display of the first user device.

Process 600 may include additional implementations, such as any single implementation or any combination of implementations described below and/or in connection with one or more other processes described elsewhere herein.

In a first implementation, the activity data corresponds to a state of a user interface associated with the first platform, and the activity information includes information associated with a user interface object of the user interface. In a second implementation, alone or in combination with the first implementation, the activity information is determined based on a data format of the activity data and a data format associated with the first platform.

In a third implementation, alone or in combination with one or more of the first and second implementations, the second user session and the first user session are associated with the first platform. In a fourth implementation, alone or in combination with one or more of the first through third implementations, the second user session is associated with a second platform that is different from the first platform. In a fifth implementation, alone or in combination with one or more of the first through fourth implementations, the plurality of nodes are authorized to access the plurality of continuity records based on the user authorizing the plurality of nodes to access the plurality of continuity records.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
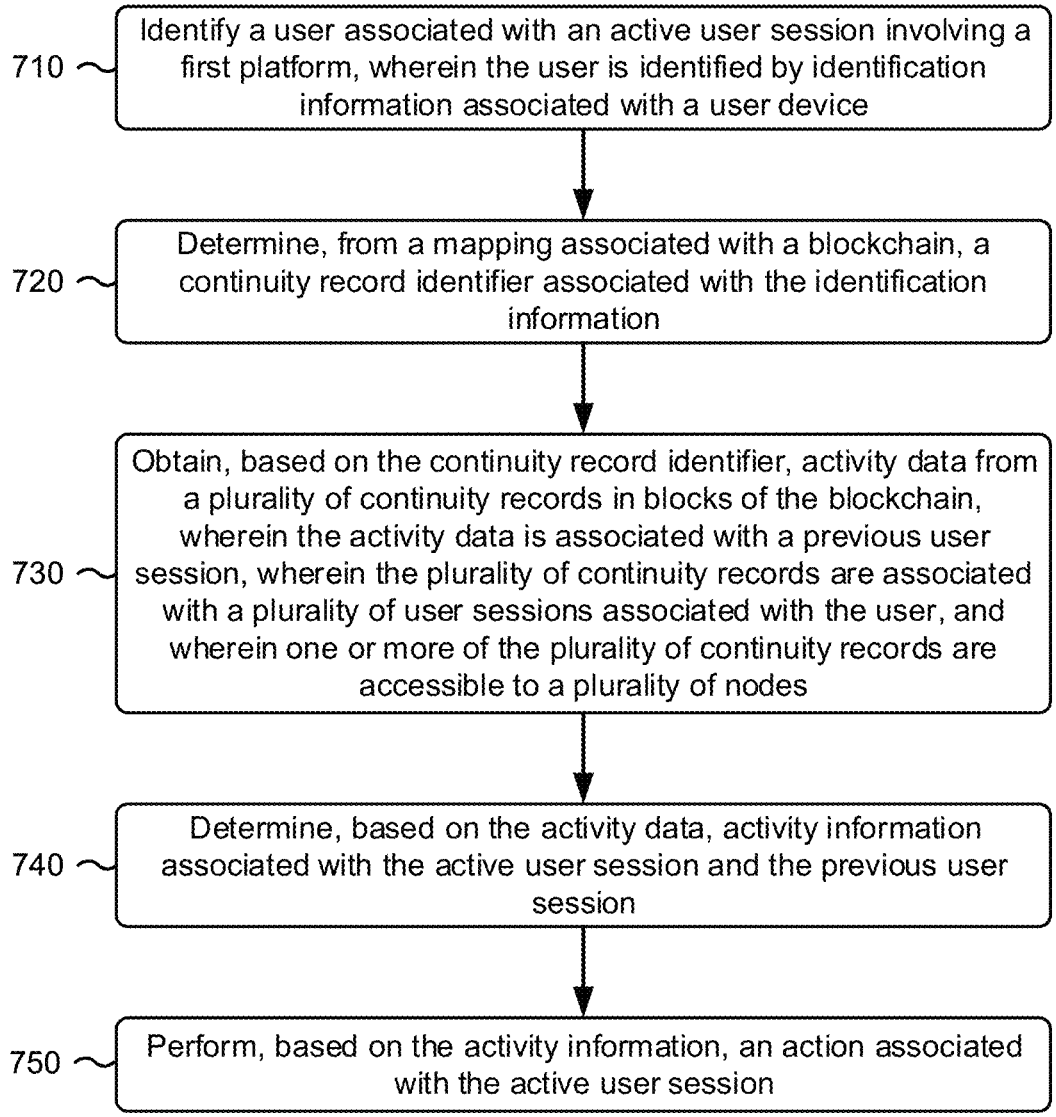

FIG. 7 is a flowchart of an example process 700 for maintaining user session continuity across multiple devices and/or multiple platforms. In some implementations, one or more process blocks of FIG. 7 may be performed by a session continuity platform (e.g., session continuity platform 310). In some implementations, one or more process blocks of FIG. 7 may be performed by another device or a group of devices separate from or including the session continuity platform, such as a computing resource (e.g., computing resource 315), a user device (e.g., user device 330), a data platform (e.g., data platform 340), a data storage device (e.g., data storage device 350), and/or the like.

As shown in FIG. 7, process 700 may include identifying a user associated with an active user session involving a first platform, wherein the user is identified by identification information associated with a user device (block 710). For example, the session continuity platform (e.g., using processor 420, memory 430, storage component 440, input component 450, output component 460, communication interface 470 and/or the like) may identify a user associated with an active user session involving a first platform, as described above. In some implementations, the user is identified by identification information associated with a user device.

As further shown in FIG. 7, process 700 may include determining, from a mapping associated with a blockchain, a continuity record identifier associated with the identification information (block 720). For example, the session continuity platform (e.g., using processor 420, memory 430, storage component 440, input component 450, output component 460, communication interface 470 and/or the like) may determine, from a mapping associated with a blockchain, a continuity record identifier associated with the identification information, as described above.

As further shown in FIG. 7, process 700 may include obtaining, based on the continuity record identifier, activity data from a plurality of continuity records in blocks of the blockchain, wherein the activity data is associated with a previous user session, wherein the plurality of continuity records are associated with a plurality of user sessions associated with the user, and wherein one or more of the plurality of continuity records are accessible to a plurality of nodes (block 730). For example, the session continuity platform (e.g., using processor 420, memory 430, storage component 440, input component 450, output component 460, communication interface 470 and/or the like) may obtain, based on the continuity record identifier, activity data from a plurality of continuity records in blocks of the blockchain, as described above. In some implementations, the activity data is associated with a previous user session. In some implementations, the plurality of continuity records are associated with a plurality of user sessions associated with the user. In some implementations, one or more of the plurality of continuity records are accessible to a plurality of nodes.

As further shown in FIG. 7, process 700 may include determining, based on the activity data, activity information associated with the active user session and the previous user session (block 740). For example, the session continuity platform (e.g., using processor 420, memory 430, storage component 440, input component 450, output component 460, communication interface 470 and/or the like) may determine, based on the activity data, activity information associated with the active user session and the previous user session, as described above.

As further shown in FIG. 7, process 700 may include performing, based on the activity information, an action associated with the active user session (block 750). For example, the session continuity platform (e.g., using processor 420, memory 430, storage component 440, input component 450, output component 460, communication interface 470 and/or the like) may perform, based on the activity information, an action associated with the active user session, as described above.

Process 700 may include additional implementations, such as any single implementation or any combination of implementations described below and/or in connection with one or more other processes described elsewhere herein.

In a first implementation, the session continuity platform, when performing the action, may detect, based on the activity data, a pattern of behavior of the user during the plurality of user sessions; select, based on the activity information and the pattern of behavior, session content for the active user session that is likely of interest to the user; and cause the user device to present the content in association with the active user session. In a second implementation, alone or in combination with the first implementation, the user is identified based on at least one of credential data used to log into the user device, credential data used to log into the first platform, or biometric data associated with the user.

In a third implementation, alone or in combination with one or more of the first and second implementations, the activity data is associated with the previous user session and one or more of the plurality of user sessions. In a fourth implementation, alone or in combination with one or more of the first through third implementations, the previous user session was associated with a second platform that is different from the first platform. In a fifth implementation, alone or in combination with one or more of the first through fourth implementations, the session continuity platform, when performing the action, may cause the user device to present the activity information to enable the active user session to resume from the previous user session.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
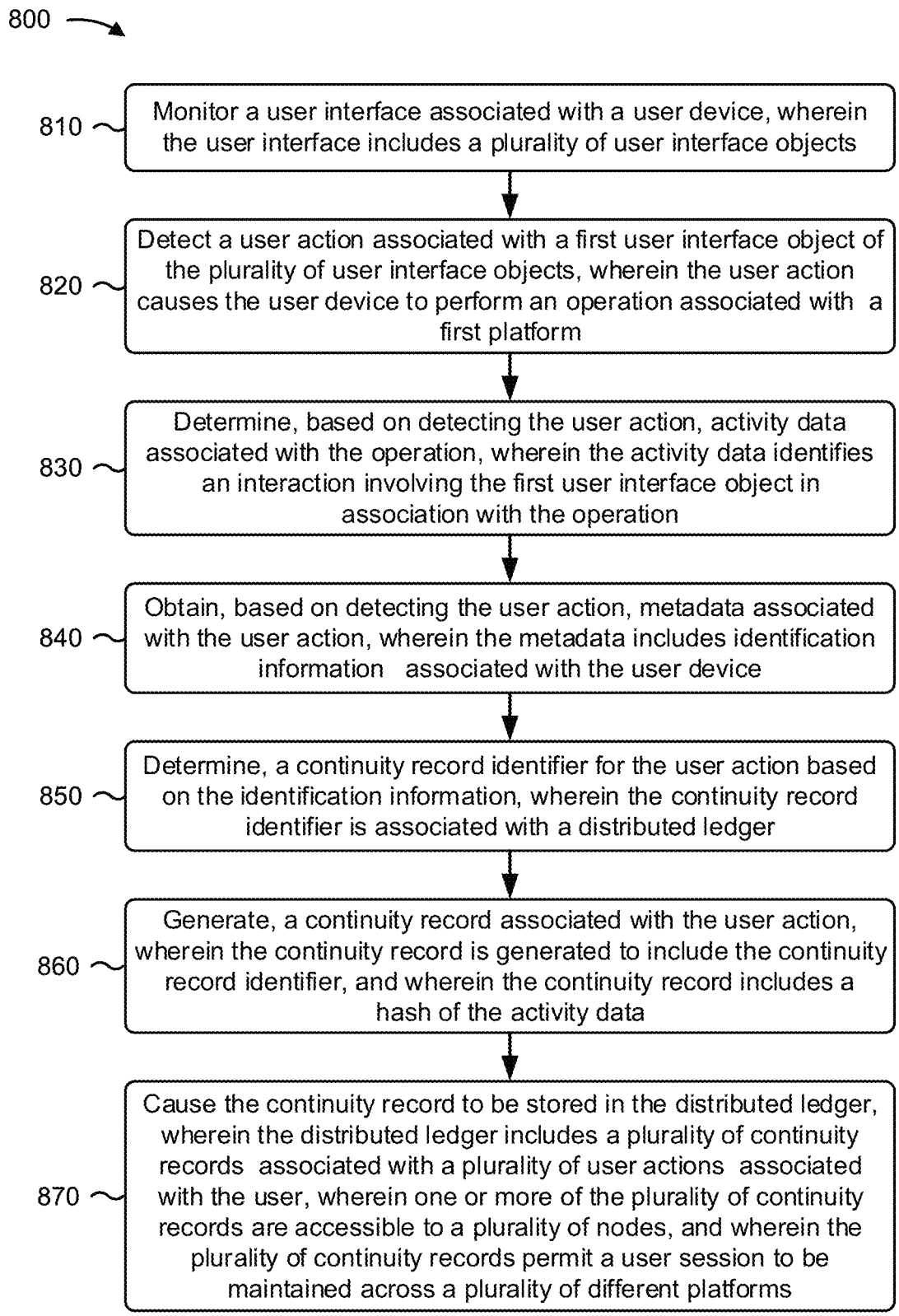

FIG. 8 is a flowchart of an example process 800 for maintaining user session continuity across multiple devices and/or multiple platforms. In some implementations, one or more process blocks of FIG. 8 may be performed by a session continuity platform (e.g., session continuity platform 310). In some implementations, one or more process blocks of FIG. 8 may be performed by another device or a group of devices separate from or including the session continuity platform, such as a computing resource (e.g., computing resource 315), a user device (e.g., user device 330), a data platform (e.g., data platform 340), a data storage device (e.g., data storage device 350), and/or the like.

As shown in FIG. 8, process 800 may include monitoring, by a device, a user interface associated with a user device, wherein the user interface includes a plurality of user interface objects (block 810). For example, the session continuity platform (e.g., using processor 420, memory 430, storage component 440, input component 450, output component 460, communication interface 470 and/or the like) may monitor, by a device, a user interface associated with a user device, as described above. In some implementations, the user interface includes a plurality of user interface objects.

As further shown in FIG. 8, process 800 may include detecting a user action associated with a first user interface object of the plurality of user interface objects, wherein the user action causes the user device to perform an operation associated with a first platform (block 820). For example, the session continuity platform (e.g., using processor 420, memory 430, storage component 440, input component 450, output component 460, communication interface 470 and/or the like) may detect a user action associated with a first user interface object of the plurality of user interface objects, as described above. In some implementations, the user action causes the user device to perform an operation associated with a first platform.

As further shown in FIG. 8, process 800 may include determining, based on detecting the user action, activity data associated with the operation, wherein the activity data identifies an interaction involving the first user interface object in association with the operation (block 830). For example, the session continuity platform (e.g., using processor 420, memory 430, storage component 440, input component 450, output component 460, communication interface 470 and/or the like) may determine, based on detecting the user action, activity data associated with the operation, as described above. In some implementations, the activity data identifies an interaction involving the first user interface object in association with the operation.

As further shown in FIG. 8, process 800 may include obtaining, based on detecting the user action, activity data associated with the user action wherein the activity data includes identification information associated with the user device (block 840). For example, the session continuity platform (e.g., using processor 420, memory 430, storage component 440, input component 450, output component 460, communication interface 470 and/or the like) may obtain, based on detecting the user action, activity data associated with the user action, as described above. In some implementations, the activity data includes identification information associated with the user device.

As further shown in FIG. 8, process 800 may include determining a continuity record identifier for the user action based on the identification information, wherein the continuity record identifier is associated with a distributed ledger (block 850). For example, the session continuity platform (e.g., using processor 420, memory 430, storage component 440, input component 450, output component 460, communication interface 470 and/or the like) may determine a continuity record identifier for the user action based on the identification information, as described above. In some implementations, the continuity record identifier is associated with a distributed ledger.

As further shown in FIG. 8, process 800 may include generating a continuity record associated with the user action, wherein the continuity record is generated to include the continuity record identifier and wherein the continuity record includes a hash of the activity data (block 860). For example, the session continuity platform (e.g., using processor 420, memory 430, storage component 440, input component 450, output component 460, communication interface 470 and/or the like) may generate a continuity record associated with the user action wherein the continuity record is generated to include the continuity record identifier, as described above. In some implementations, the continuity record is generated to include the continuity record identifier. In some implementations, the continuity record includes a hash of the activity data.

As further shown in FIG. 8, process 800 may include causing, by the device, the continuity record to be stored in the distributed ledger wherein the distributed ledger includes a plurality of continuity records associated with a plurality of user actions associated with the user, wherein one or more of the plurality of continuity records are accessible to a plurality of nodes and wherein the plurality of continuity records permit a user session to be maintained across a plurality of different platforms (block 870). For example, the session continuity platform (e.g., using processor 420, memory 430, storage component 440, input component 450, output component 460, communication interface 470 and/or the like) may cause, by the device, the continuity record to be stored in the distributed ledger, as described above. In some implementations, the distributed ledger includes a plurality of continuity records associated with a plurality of user actions associated with the user. In some implementations, one or more of the plurality of continuity records are accessible to a plurality of nodes. In some implementations, the plurality of continuity records permit a user session to be maintained across a plurality of different platforms.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  monitoring, by a node of a plurality of nodes and during a user session, a user interface associated with a first user device,
    wherein the user interface includes a plurality of user interface objects, and
    wherein the user interface is associated with a first platform;
  detecting, by the node, a first user action of the user session,
    wherein the first user action is associated with a first user interface object of the plurality of user interface objects;
  determining, by the node, identification information of a user associated with the first user action;
  determining, by the node, a continuity record identifier associated with the identification information;
  obtaining, by the node, a continuity record associated with the continuity record identifier,
    wherein the continuity record is stored in a distributed ledger, wherein the distributed ledger includes a plurality of continuity records associated with a plurality of user actions during previous user sessions associated with the user,
wherein one or more of the plurality of continuity records are accessible to the plurality of nodes,
wherein the plurality of nodes correspond to one or more devices or one or more platforms capable of resuming the user session, and
wherein each of the plurality of nodes is permitted to determine a state of the user session;
obtaining, by the node and from the continuity record, activity data associated with a second user action,
wherein the second user action is performed via a second user device,
wherein the second user action is performed prior to the first user action,
wherein the second user action is one of the plurality of user actions, and
wherein the second user action involves the user interface object;
determining, by the node and based on the activity data, activity information associated with the first user action and the second user action;
detecting, by the node and based on the activity data, a pattern of behavior of the user during the first user action and the second user action;
selecting, by the node and based on the activity information and the pattern of behavior, session content for the first user device that is likely of interest to the user; and
causing, by the node, the first user device to present the session content,
wherein the session content is presented via a display of the first user device to permit the first user device to resume a user session associated with the second user device.

2. The method of claim 1, wherein the second user action is performed via a second platform that is different from the first platform.

3. The method of claim 2, wherein at least one of:
the first platform is a first operating system and the second platform is a second operating system that is different from the first operating system,
the first platform is a first application and the second platform is a second application that is different from the first application, or
the first platform is a user device application and the second platform is a web-based application.

4. The method of claim 1, wherein the continuity record identifier is determined using a mapping of a plurality of user identities and a plurality of continuity record identifiers.

5. The method of claim 1, wherein the identification information is determined based on an identifier associated with the first user device.

6. The method of claim 1, wherein the second user device is different from the first user device,
wherein the first user device and the second user device are nodes of the plurality of nodes.

7. The method of claim 1, wherein the distributed ledger comprises a blockchain,
wherein the plurality of continuity records are stored in blocks of the blockchain.

8. The method of claim 1, wherein the user interface is a first user interface, and
wherein the activity information is caused to be presented based on a conversion of the activity data to a first protocol associated with the first user interface from a second protocol associated with a second user interface that is used to perform the second user action.

9. A device, comprising:
one or more memories; and
one or more processors, communicatively coupled to the one or more memories, configured to:
detect a user action during a first user session associated with a user device,
wherein the first user session is associated with a first platform;
determine identification information of a user associated with the first user session;
determine a continuity record identifier associated with the identification information;
obtain, based on the continuity record identifier, activity data from a plurality of continuity records of a distributed ledger,
wherein the activity data is associated with a second user session,
wherein the plurality of continuity records are associated with a plurality of user sessions associated with the user, and
wherein one or more of the plurality of continuity records are accessible to a plurality of nodes,
wherein the plurality of nodes correspond to one or more devices or one or more platforms capable of resuming the second user session, and
wherein each of the plurality of nodes is permitted to determine a state of the second user session;
determine, based on the activity data, activity information associated with the user action and the second user session;
detect, based on the activity data, a pattern of behavior of the user during the first user session and the second user session;
select, based on the activity information and the pattern of behavior, session content for the first user session that is likely of interest to the user; and
cause the user device to present the session content in association with the first user session,
wherein the session content is presented via a display of the user device to permit the user device to resume a user session associated with another user device.

10. The device of claim 9, wherein the activity data corresponds to a state of a user interface associated with the first platform, and
wherein the activity information includes information associated with a user interface object of the user interface.

11. The device of claim 9, wherein the activity information is determined based on a data format of the activity data and a data format associated with the first platform.

12. The device of claim 9, wherein the second user session and the first user session are associated with the first platform.

13. The device of claim 9, wherein the second user session is associated with a second platform that is different from the first platform.

14. The device of claim 9, wherein the plurality of nodes are authorized to access the plurality of continuity records based on the user authorizing the plurality of nodes to access the plurality of continuity records.

15. A non-transitory computer-readable medium storing instructions, the instructions comprising:

one or more instructions that, when executed by one or more processors, cause the one or more processors to:
identify a user associated with an active user session involving a first platform,
wherein the user is identified by identification information associated with a user device;
determine, from a mapping associated with a blockchain, a continuity record identifier associated with the identification information;
obtain, based on the continuity record identifier, activity data from a plurality of continuity records in blocks of the blockchain,
wherein the activity data is associated with a previous user session,
wherein the plurality of continuity records are associated with a plurality of user sessions associated with the user, and
wherein one or more of the plurality of continuity records are accessible to a plurality of nodes,
wherein the plurality of nodes correspond to one or more devices or one or more platforms capable of resuming the previous user session, and
wherein each of the plurality of nodes is permitted to determine a state of the previous user session;
determine, based on the activity data, activity information associated with the active user session and the previous user session; and
perform, based on the activity information, an action associated with the active user session,
the action being associated with enabling the active user session to resume from the previous user session;
wherein the one or more instructions that cause the one or more processors to perform the action, cause the one or more processors to:
detect, based on the activity data, a pattern of behavior of the user during the plurality of user sessions;
select, based on the activity information and the pattern of behavior, session content for the active user session that is likely of interest to the user; and
cause the user device to present the session content in association with the active user session.

16. The non-transitory computer-readable medium of claim 15, wherein the user is identified based on at least one of:
credential data used to log into the user device,
credential data used to log into the first platform, or
biometric data associated with the user.

17. The non-transitory computer-readable medium of claim 15, wherein the activity data is associated with the previous user session and one or more of the plurality of user sessions.

18. The non-transitory computer-readable medium of claim 15, wherein the previous user session was associated with a second platform that is different from the first platform.

19. The non-transitory computer-readable medium of claim 15, wherein the one or more instructions that cause the one or more processors to perform the action, cause the one or more processors to:
cause the user device to present the activity information to enable the active user session to resume from the previous user session.

20. The method of claim 1, wherein the activity information is determined based on a data format of the activity data and a data format associated with the first platform.

* * * * *